O. J. TUBBS.
DEVICE FOR USE IN CUTTING BEANS.
APPLICATION FILED JAN. 29, 1919.
1,315,056.
Patented Sept. 2, 1919.
2 SHEETS—SHEET 1.
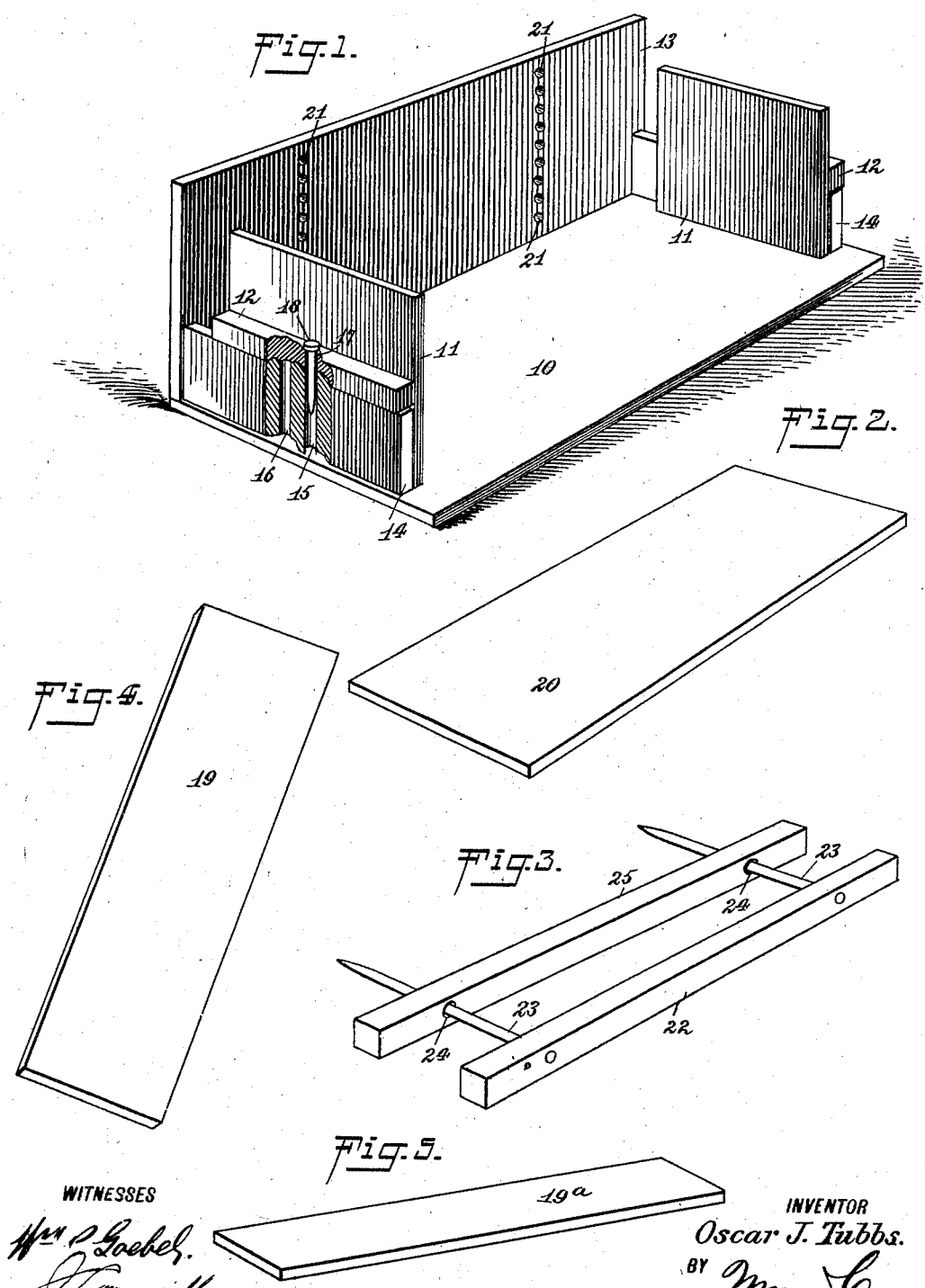
WITNESSES
INVENTOR
Oscar J. Tubbs.
BY
ATTORNEYS O. J. TUBBS.
DEVICE FOR USE IN CUTTING BEANS.
APPLICATION FILED JAN. 29, 1919.
1,315,056.
Patented Sept. 2, 1919.
2 SHEETS—SHEET 2.
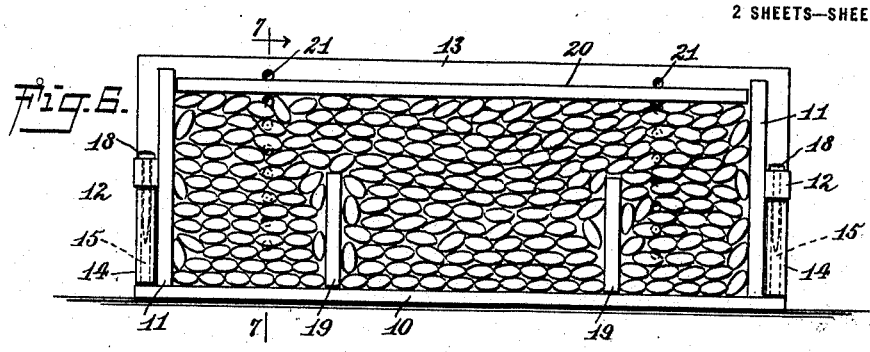
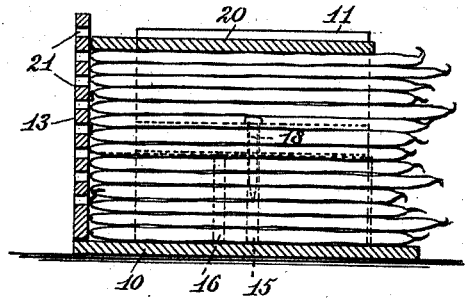
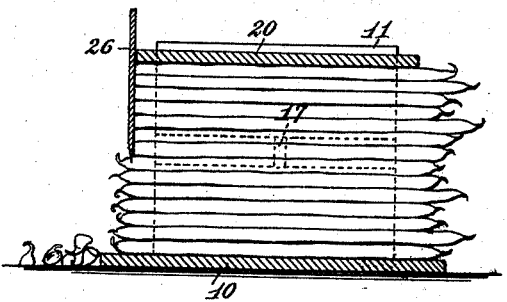
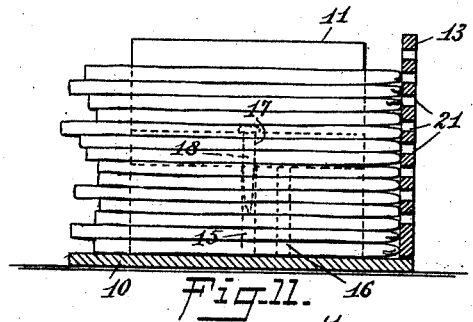
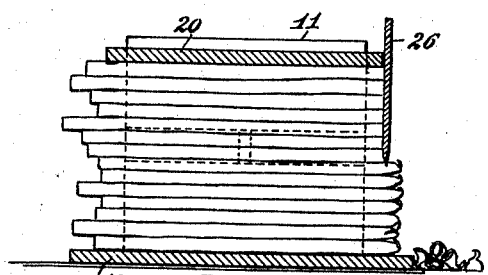
WITNESSES
William P. Goebel.
J. L. McAuliffe
INVENTOR
Oscar J. Tubbs.
BY
ATTORNEYS

UNITED STATES PATENT OFFICE.

OSCAR J. TUBBS, OF WINSLOW, MAINE.

DEVICE FOR USE IN CUTTING BEANS.

1,315,056. Specification of Letters Patent. Patented Sept. 2, 1919.

Application filed January 29, 1919. Serial No. 273,828.

*To all whom it may concern:*

Be it known that I, OSCAR J. TUBBS, a citizen of the United States, and a resident of Winslow, in the county of Kennebec and State of Maine, have invented a new and Improved Device for Use in Cutting Beans, of which the following is a description.

My invention relates to means for cutting string beans and has for its general object to provide a device wherein the beans may be deposited and alined for trimming the beans at one end; together with means for repeating the alining and trimming operation with respect to the opposite end of the beans, and means to hold the trimmed beans and constituting a movable gage for determining the successive cuts to be produced in cutting the beans into the desired uniform lengths.

The nature of the invention and its advantages will more clearly appear from the specific description following.

Reference is to be had to the accompanying drawings forming a part of this specification, it being understood that the drawings are merely illustrative of one example of the invention.

Figure 1 is a perspective view of portions of the device adjusted for receiving the beans;

Fig. 2 is a perspective view of the top plate or board to be used for pressing down the beans for trimming the ends;

Fig. 3 is a perspective view of a gage and holding device to be hereinafter referred to;

Fig. 4 is a perspective view of one of the strips to be inserted vertically among the beans for facilitating the alining of the beans;

Fig. 5 is a view similar to Fig. 4 but indicating a variant of the strip shown in Fig. 4;

Fig. 6 is a front view of the device adjusted as in Fig. 1 and with the beans and the strip shown in Fig. 4 in position;

Fig. 7 is a transverse vertical section on the line 7—7, Fig. 6, indicating the mode of alining the beans at one end for trimming;

Fig. 8 is a view similar to Fig. 7 but with a portion of the structure removed, to permit of the beans being trimmed at their alined ends;

Fig. 9 is a view similar to Fig. 7 but with the parts adjusted for alining the beans at the second end;

Fig. 10 is a view similar to Fig. 9 but with a portion of the structure removed and indicating the mode of trimming the beans at the second end;

Fig. 11 is a view similar to Fig. 10 but with both ends of the beans trimmed and the top board removed preparatory to the step of cutting the trimmed beans into lengths;

Fig. 12 is a view similar to Fig. 11, with the gage and presser device in position as in cutting the beans into lengths.

It is to be understood that the parts of the device may be constructed of wood, metal, or other suitable material.

In carrying out my invention in practice, a flat base 10 is provided, rising from which are end members 11, said members terminating short of the front and back edges of the base and also being set in from the ends of the base. On the exterior of the upstanding end members 11 are rigid horizontal cleats 12 between the top and bottom edges of said end members. An upright butt board or plate 13 is provided to constitute a back or front for the structure by being positioned along either longitudinal edge of the base perpendicular to the latter against which plate the ends of the beans may be caused to abut. Said butt board does not extend beyond the edges of the base 10 in order that the latter may be struck against any fixed object for jarring the structure in alining the beans as hereinafter further referred to. Arms 14 rigid with the butt board 13 extending forwardly from a face thereof at the ends near the bottom of said board, are adapted to be received beneath the cleats 12 between the same and the base 10. Said arms have two parallel holes 15, 16 and the cleats 12 are each formed with a vertical hole 17 for receiving a pin 18 which may enter also either the pin holes 15 or the pin holes 16 when registering with the hole 17. Initially the butt board 13 is disposed along one edge of the base 10 as indicated in Fig. 1 and with the holes 15 registering with the holes 17, and pins 18 inserted. Beans are now filled in approximately parallel, between the upright end members 11 and the device jarred until the beans are more nearly parallel, and abutting at one end against the butt board or plate 13. To assist in the alining of the beans by jarring the structure, I employ vertical strips 19 which are pressed down among the beans at separated points, parallel with each other and with the ends 11, said strips resting at their lower edges on the base 10. The supporting strips 19 are of a height to lie below the top of the mass of beans as indicated in Fig. 6. These strips should be covered and if the quantity of beans available is less than sufficient to fill the space between the ends 11, then smaller strips as at 19$^a$, Fig. 5, are employed instead of the strips 19, the relative sizes of said strips being apparent from a comparison of Figs. 4 and 5. When the beans have been jarred into alinement and abut at one end uniformly against the butt board 13, the latter, as in Fig. 7, is removed and the strips 19 pushed inward from the alined ends of the beans for the trimming of the latter. During the jarring operation a top 20 is placed on the beans, constituting a presser board and this is pressed gently down upon the beans while being jarred and one edge of said board lying against the butt board 13. For trimming the beans after the removal of the butt board 13 with its arms 14 any suitable knife partially indicated at 26 is employed, the top board being first moved back from the alined butt ends of the beans as indicated in Fig. 8, so that the adjacent edge of the top board constitutes a gage for the knife in cutting. The beans having thus been trimmed at one end, the butt board 13 is then placed at the opposite side of the structure as in Fig. 9 and the arms 14 positioned to again aline the holes 15 with the holes 17 for receiving the pin 18. After the ends of the beans adjacent to the butt board in the new position have been alined, said butt board is again removed and the beans trimmed at the second end as indicated in Fig. 10. The top gage board 20 is now removed, leaving the beans trimmed at both ends and in condition illustrated in Fig. 11. In order now to cut the beans into required lengths, the strips 19 are removed, the butt board 13 is again placed at the same side from which it was last removed, but directly against the ends 11, as indicated in Fig. 12, the pin 18 is inserted, and the presser and gage shown in Fig. 12 is employed instead of the presser and gage 20. Said cutting gage of Fig. 12 (and Fig. 3) includes an elongated bar 22 having rigid therewith pins 23, such as wire nails or the like, there being a second gage bar 25 having holes 24 therein through which the pins 23 pass loosely. The gage is placed on top of the beans and the ends of the pins 23 caused to pass through holes 21 in the butt board 13, there being vertical series of said holes to accommodate the pins at different heights according to the quantity of beans in the structure. The bar 25 will lie adjacent to the butt board 13 and the outer bar 22 in a position to act as a gage for the knife in cutting off a given length of the beans, said gage bar being shifted toward the bar 25 for the successive cuts. The combined thickness of the bars 22, 25 will not be greater than the predetermined length into which the beans are to be cut.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A device of the class described including a holder, having upright end members and adapted to receive the articles to be cut, a separate upright butt board adapted to be positioned on said holder at either of its opposite sides, and means to hold the butt board in different positions relatively to a side of the holder and relatively to said end members.

2. A device of the class described including a holder having upright end members and adapted to receive the articles to be cut, a separate upright butt board adapted to be positioned on said holder at either of its opposite sides, means to hold the butt board in different positions relatively to a side of the holder and relatively to said end members, and a presser device adapted to fit between said end members of the holder on top of the articles to be cut and constitute a gage in cutting the articles.

3. A device of the class described including a holder having upright end members, a butt board adapted to constitute a side of the holder at either side thereof, means to secure the butt board in adjusted position on the holder, said holder with the butt board thereon being adapted to be jarred for alining the articles to be cut, and separate upright members of less height than the end of the holder and adapted to be positioned in the latter parallel with said ends to freely respond to the jarring movement and assist in alining the articles to be cut.

4. A device of the class described including a holder presenting upright end members and adapted to receive the articles to be cut, an upright butt board adapted to be positioned at either of the opposite sides of said holder, arms on said butt board and slidably engageable with the holder outside of the said ends for adjusting the position of the butt board on said holder, and means engageable with said arms to hold the butt board in adjusted position.

5. A device of the class described including a holder, presenting upright end members and adapted to receive the articles to be cut, horizontal cleats on said end members above the bottom of the holder, said cleats having each a vertical hole therein, a butt board adapted to be positioned on either of the opposite sides of said holder, arms on said butt board and extending from a face thereof, said arms being slidably receivable between the bottom of the holder and said cleats, and provided with vertical holes, either of which is adapted to register with the holes in the cleats, and a fastening element adapted to be received in the registering holes of the arms and cleats.

6. A device of the class described including a holder having upright end members and adapted to receive the articles to be cut, a butt board against which the ends of the articles to be cut may be abutted, said board being adapted to be positioned at a side of the holder, and a presser device adapted to fit between the end members of the holder on top of the articles to be cut, and means on said presser device for adjustably engaging said butt board to adjust the presser device for gaging successive cuts.

7. A device of the class described including a holder having upright end members and open at opposite sides, a butt board adapted to constitute a side of the holder at either of said open sides, and means to secure the butt board in position on the holder at either side.

8. A device of the class described including a holder having upright end members and open at opposite sides, a butt board adapted to constitute a side of the holder at either of said open sides, and means to secure the butt board in position on the holder at either side; together with separating elements adapted to rest upright in the holder among the articles to be cut and to be moved freely longitudinally to properly dispose said elements relatively to either side of the holder.

9. A device of the class described including a holder open at opposite sides and adapted to be bodily jarred whereby to dispose in parallel relation the articles to be cut, means applicable to either open side for alining the ends of the articles to be cut, and separate upright elements adapted to be positioned in the holder among the articles to be cut and disposed parallel with said articles while the holder is being jarred, said elements being adapted to be moved lengthwise to position the same more or less distant from a given side of the holder.

OSCAR J. TUBBS.

Copies of this patent may be obtained for five cents each, by addressing the "Commissioner of Patents, Washington, D. C."